Figure 2:
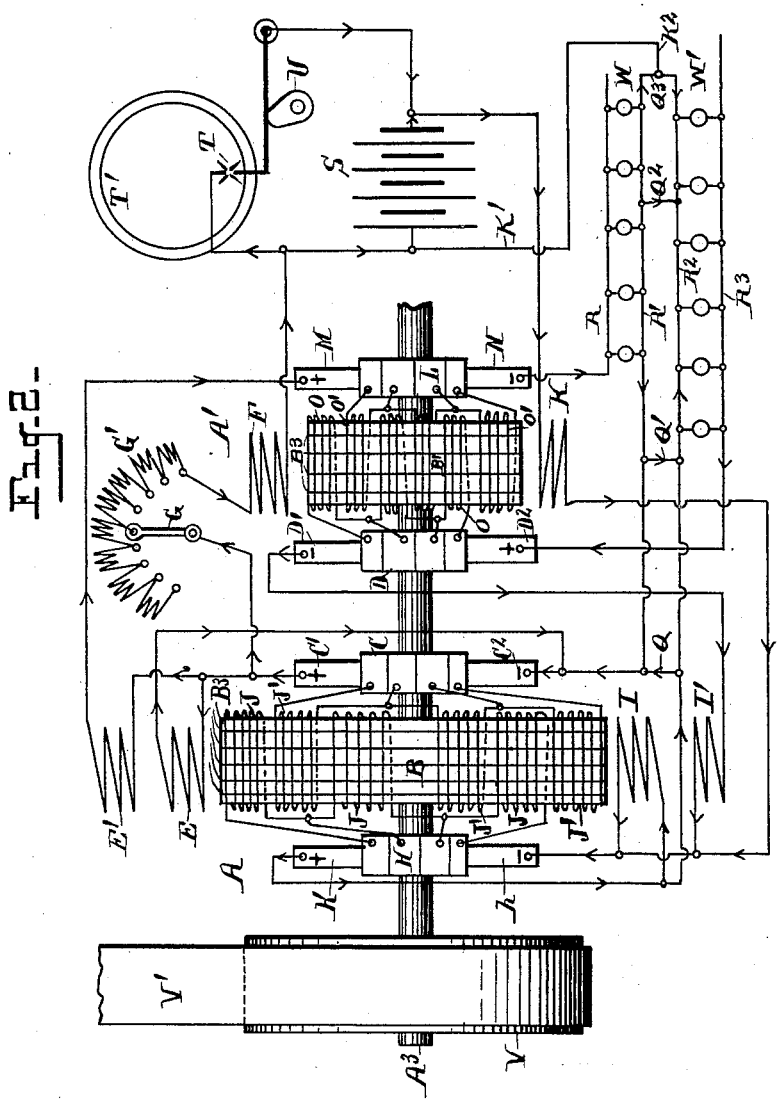

(No Model.)
2 Sheets—Sheet 1.
T. H. HICKS.
ELECTRICAL CONSTRUCTION, REGULATION, AND DISTRIBUTION.
No. 566,860.
Patented Sept. 1, 1896.
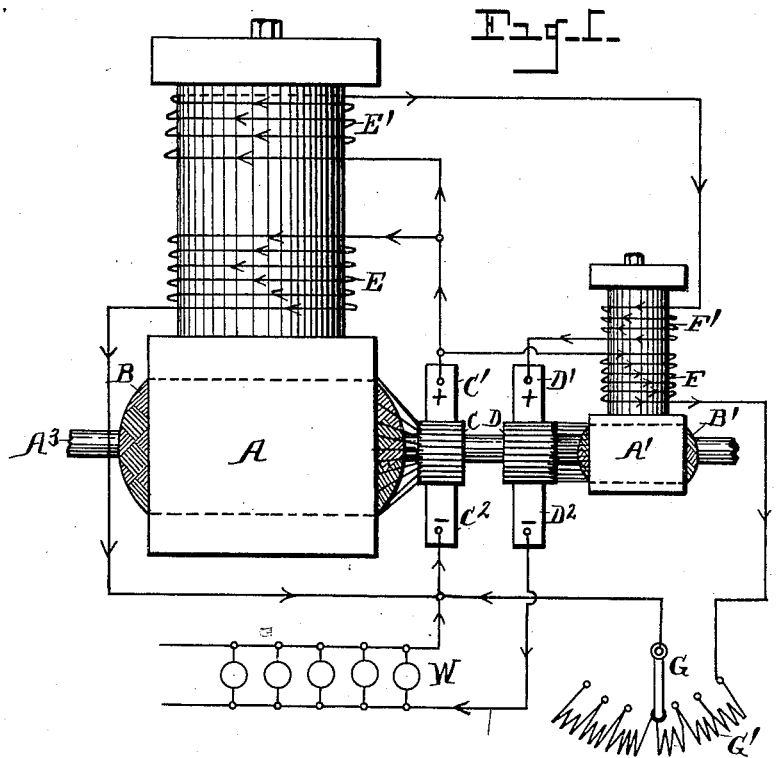
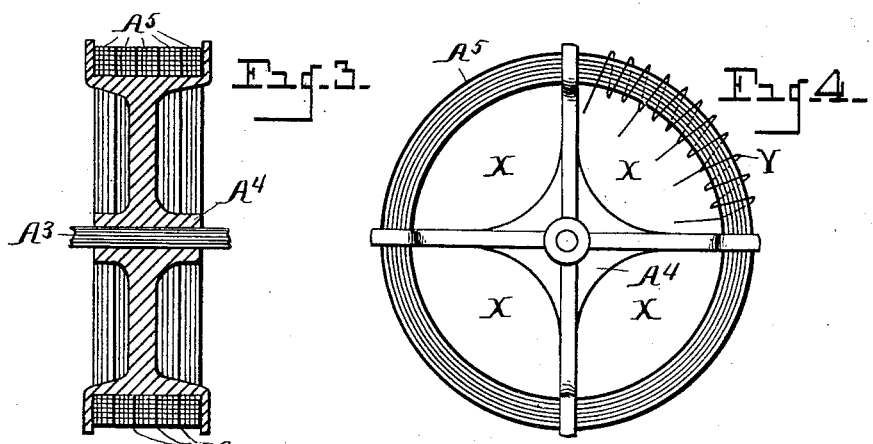
WITNESSES
O. B. Baruziger.
M. D. Martin.
INVENTOR
Thomas H. Hicks
By his Attorney
Newell S. Wright (No Model.) 2 Sheets—Sheet 2.

T. H. HICKS.
ELECTRICAL CONSTRUCTION, REGULATION, AND DISTRIBUTION.

No. 566,860. Patented Sept. 1, 1896.

WITNESSES
O. B. Barnzger.
M. A. Martin.

INVENTOR
Thomas H. Hicks
By his Attorney
Newell S. Wright

UNITED STATES PATENT OFFICE.

THOMAS H. HICKS, OF DETROIT, MICHIGAN.

ELECTRICAL CONSTRUCTION, REGULATION, AND DISTRIBUTION.

SPECIFICATION forming part of Letters Patent No. 566,860, dated September 1, 1896.

Application filed February 1, 1895. Serial No. 536,909. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in Electrical Construction, Regulation, and Distribution; and I declare the following to be a full, clear, and exact description of the invention, such as will enable others skilled in the art to which it appertains to make and use the same, reference being had to the accompanying drawings, which form a part of this specification.

This invention relates to new and useful improvements in electrical construction, regulation, and distribution.

My whole scheme embraces the combination of two electric generators, a work-circuit, and a secondary battery, and is designed for employment with a gas-engine and with other motive powers, as a steam-engine or electric motor, for example. It is more especially intended, however, for employment with a gas-engine, *i. e.*, an engine using either gas or hydrocarbon fluid mixed with air and exploded for producing power.

One of the most essential objects of my scheme is to counteract variations in the speed of the motive power used to drive a work-circuit generator, so that the difference of potential at the distributing-brushes of the work-circuit generator shall remain constant in effect during all such variations in speed. It is a well-known fact that gas-engines can produce cheap power; but the explosions of gas in the cylinder of the engine cause such variations in speed that it is therefore impossible to drive electric generators by such engines and maintain a constant potential work-circuit. This part of my invention does not refer to improvements for preventing fluctuations in the speed of the engine, but, instead thereof, to set up inverse or counteracting effects in the work-circuit simultaneously with every variation in the speed of the engine. This I accomplish in the following simple and effective manner:

I arrange a counteracting low-potential generator in the work-circuit, the current of this generator tending to flow in an opposite direction to the current of the work-circuit generator. The counteracting-generator therefore acts as a resistance to the work-circuit. As the two generators are driven by the same power, therefore when the voltage of one generator either rises or falls, the voltage of the other generator will always rise and fall proportionately. We will suppose that the work-circuit generator produces a pressure of one hundred and ten volts and the counteracting-generator ten volts. The work-circuit translating devices would therefore be supplied with a current of only one hundred volts pressure, ten volts being consumed by the ten-volt generator. If the speed should increase enough to cause a ten per cent. rise in the pressure of the work-circuit generator; then ten per cent. more current would, if nothing prevented, flow through the translating devices. This would cause an increase in the brilliancy of any lamps included among the translating devices; but, inasmuch as the voltage of the counteracting-generator would rise ten per cent. also, therefore there would be ten per cent. more resistance added to the work-circuit, which would just be sufficient to counteract the effects of the increased pressure of the work-circuit generator, so as to leave the volume of current flowing through the translating devices unchanged. If the speed of the two generators should decrease instead of increase, then suitably inverse effects would occur, agreeable to a falling potential, in a manner which will be readily understood.

A second part of my invention refers to the application of my new system of regulation to a double work-circuit in which the translating devices are arranged in multiple-series order, and requiring two sources of electricity to supply such double work-circuit.

A third part of my invention refers to a new scheme for arranging two multiple-arc work-circuits in linear series with each other, so as to thereby form a multiple-series work-circuit suitable for either two armature-circuits mounted upon one shaft or two distinct armatures located upon separate shafts.

A fourth part of my invention refers to a scheme for supplying an electric sparking device with current, which is used for igniting the gas to operate the gas-engine.

A fifth part of my invention refers to the construction of the armature-core used in the two generators which are arranged to supply and control the work-circuit.

My invention in all of its details is fully elucidated in the following specification, and illustrated in the drawings hereto annexed. The drawings do not show complete constructions, parts which are non-essential to enlighten such persons as are skilled in this art having been omitted, and the drawings, too, are largely diagrammatic. The drawings, then, it will be understood, are intended to show the functions of the different parts instead of adhering to perfect representations of complete structures.

Figure 1 is a side elevation showing the application of my regulating scheme as applied to a single multiple-arc work-circuit. Fig. 2 is also a side elevation and diagram view showing all parts of my invention and the application of my regulating scheme as applied to a double multiple-arc work-circuit. Fig. 3 is a section of the armature-core lengthwise through the shaft. Fig. 4 is an end view of the armature-core and showing a few convolutions of the conductor wound upon one-quarter of said core.

The essential parts in each figure are indicated by letters, and like letters of reference indicate like parts. Each part is indicated and explained as follows:

Looking first at Fig. 1, A is a work-circuit generator, and A' is a resistance or counteracting generator. $A^3$ is a shaft having mounted thereupon the work-circuit-generating armature B and the work-circuit resistance or counteracting generating-armature B'. C is the commutator of the armature B, and C' $C^2$ are brushes. D is the commutator for the armature B', and D' $D^2$ are its brushes. E is a shunt field-magnet coil of the generator A for primarily exciting the machine to generative action, and E' is a series or supplemental field-magnet coil of the same generator.

F is a primary exciting field-magnet coil of the generator A', and F' is a differential field-magnet coil of the generator A', arranged in series with the work-circuit, (marked W.) G is a switch, and G' are resistances arranged in electrical circuit with the field-coil F, the switch being used to either cut the resistance G' in or out of circuit, thereby varying the current, so as to regulate the field of force of the generator A' suitable for the work-circuit resistance. The field-coils F and F' of the generator A', I show to be supplied with current from the generator A; but of course the generator A' could be made self-exciting by winding the armature with two circuits, each terminating in a separate commutator.

In the modification which I show in Fig 2, which is suitable for operating two work-circuits W and W', arranged in series with each other, I show each armature B and B' to be wound with two circuits, each circuit terminating in a separate commutator. I show, also, four sets of field-magnet coils for the generator A and two sets of primary coils F and K for the generator A'. Bearing these points of distinction in mind, then, the additional parts shown in this figure are lettered as follows:

H is an extra commutator, and $h$ and $h'$ are the commutator-brushes, all belonging to the generator A.

I is a second set of shunt field-coils, and I' is a second set of supplemental or series field-coils of the generator A. The armature B of this generator is wound with two sets of coils, (marked J and J', respectively.) The coils J terminate in the commutator H and supply the work-circuit W' with current, and the coils J' terminate in the commutator C and supply the work-circuit W.

K is an extra set of field-coils of the generator A'. K' is a compensating conductor, and is connected to the two work-circuits at $K^2$. In this way the two sets of coils F and K can be supplied with current from either one or both armature-circuits J and J' in a manner which will be readily understood.

L is a second commutator of the armature B', and M N are its brushes. The armature B' has also two sets of coils O and O', coils O terminating in the commutator D and coils O' terminating in the commutator L. The two armatures B and B', therefore, are intended to be constructed alike, except in respect to size, electric pressure each is intended to generate, and the functions they are intended to perform.

Q Q' $Q^2$ $Q^3$ are branch conductors joining the two work-circuits W and W' in linear series with each other. The number of said branches required to join the two circuits is a matter of choice. The resistance between the two circuits, of course, will be lowered by additional branches. The two work-circuits W and W', it will be noticed, have a total of four conductors (marked R R' $R^2$ $R^3$) besides the branches Q. In this respect my scheme differs from the Edison "three-wire system," in which only three main-line conductors are used. The conductors R' and $R^2$ need not be so large in cross-section as the conductors R and $R^3$, from the fact that the current must necessarily divide and flow in opposite directions through the conductors R' $R^2$, as indicated by the arrow-heads located thereupon.

S is a secondary battery. T is a sparking device for igniting the gas in the cylinder T', which is supposed to represent a gas-engine. U is a cam for operating the sparking device. V is a pulley located upon the armature-shaft $A^3$. V' is a driving-belt, which may represent the transmission of power from any desired source.

In Figs. 3 and 4, $A^4$ is a brass spider. $A^5$ are a number of iron-wire coils, each coil being separated by radial insulating-disks B³. The insulating-disks are shown in the two generators in Fig. 2. In constructing one of these armature-cores the spaces X, Fig. 4, are filled with wood, which is covered on the periphery with plaster-of-paris. After being turned off the wire is then wound in sections, as indicated, the sections being separated from each other by the disks or septa B³. In this way an armature-core may be formed of uncovered iron wire, the insulating-septa B³ being a safeguard against induced currents flowing from one iron coil to another. After the iron wire has been wound upon the spider A⁴ the plaster-of-pairs and wood may then be removed, and the conductors Y may then be wound in any suitable manner for an annular ring-armature.

Having thus explained the various parts, I will now give a detailed description of the operation.

Looking first at Fig. 1, which represents a single work-circuit having its translating devices arranged in multiple-arc system, we will suppose that the speed of the driving power varies five per cent. Then the resistance-generator A' would be adjusted by the switch G, which throws the resistances G' in linear series with the exciting-coil F, and thereby brings the field of force in which the armature of A' revolves to a suitable strength for producing a counter electromotive force in the armature of A', which would equal five per cent. of the electromotive force of the generator A. The pressure of the generator A would therefore require to be adjusted so as to compensate for the five per cent. which will be consumed in the generator A' through its counter electromotive force. It will be readily understood by electricians that if the five per cent. counter electromotive force be suitable when one ampere of current flows through the armature of A' and the work-circuit said counterforce would not be suitable if one hundred amperes were to flow through the same circuit, for the fall of potential between the brushes of the counterforce-generator A' will increase proportional to the volume of current which flows through its circuit. It therefore becomes necessary to prevent the counterforce of the generator A' from increasing above the five volts as the volume of current increases through its circuit by turning on more translating devices in the work-circuit. This I accomplish by the differential series coil F', wound on the field-magnets of the generator A'. As will be readily understood, this coil F' demagnetizes the field-cores proportional to the volume of current flowing through its circuit. Now, as the same volume of current flows through this series coil that flows through the armature-circuit of which it forms a part, therefore, by suitably adjusting the number of convolutions of this series coil, it can thereby be made to drop the fall of potential by its current, so as to just counteract to a proper extent the action of the same current flowing through the counterforce-armature of A'. The magnetic flux of the generator A' of course is increased by the coil F and decreased by the series coil F'. I wish it to be understood, however, that the series differential coil F' could be dispensed with by appropriately overcompounding the generator A by additional coils being added to its series coil; but such a scheme would be too inefficient, from the fact that the counter resistance of the generator A' would keep on increasing with the volume of current flowing through its armature, and the generator A would require to overcome this loss by generating a correspondingly-higher pressure, which means additional consumption of power. It may be thus readily understood that the series coil F' of the counter electromotive-force generator A' forms the essential element for economically maintaining a constant difference of potential between its brushes D' and D², so as to produce a suitable resistance to the work-circuit when the speed of the driving power increases or decreases. When the speed of the driving power changes, the voltage of the two generators A and A' changes correspondingly, and as the counter resistance set up by the generator A' is just sufficient to counteract any increase of potential in the work-circuit generator A, therefore any fluctuations in speed of the driving power will be readily compensated for in a manner which will be fully understood by any one skilled in this art. The series coil E' of the work-circuit generator A also has a special function to perform which is not performed in ordinary multiple-arc work-circuit where a counter electromotive-force generator is not used, and therefore the two series coils E and F' of the two generators A and A', being arranged in combination and in series with each other, form an element of this invention.

As already stated, the potentials of the two generators A and A' always rise and fall together when the speed varies. In this way, when the generator A tends to generate a higher potential, then the generator A' counteracts it by meeting the increased pressure with a suitable opposing force. The field-coil F of the generator A' is supplied with current from the generator A. Therefore when the voltage of the generator A rises, more current will flow through the coil F, and this in return will raise the counter electromotive force of the generator A', so as to offset the increased voltage of the generator A. It may thus be seen that the two generators oppose each other in two ways—first, by the speed, and, second, by the current which flows through the field-magnet coils; but the changes in voltage due to variations in speed are absolutely instantaneous, while similar changes, which are due to variations in the flow of current through the field-magnet coils, are not instantaneous, from the fact that a counter electromotive force is always set up in the field-coils whenever the field magnetism varies. It is therefore impossible to counteract the effects of a varying speed by operating upon the field magnetism of a generator. My scheme, therefore, for placing a counter-electromotive-force resistance in a work-circuit instead of mechanically cutting resistances, in the shape of coils, in and out of circuit, is a valuable improvement. Furthermore, by my scheme I am enabled to obtain a change of resistance suitable to the slightest changes in speed. I am therefore enabled to maintain a constant-potential work-circuit, even when the generators are driven from gas-engines, steam-engines, and even from any source of fluctuating power.

The modification I show in Fig. 2 virtually represents two such circuits as are seen in Fig. 1. The work-circuit W' is supplied with current from the armature-circuit which terminates in the commutator H, and has for a counter-electromotive-force armature the armature-windings which terminate in the commutator D. The work-circuit W is supplied with current from the armature-circuit which terminates in the commutator C, and has for a counter-electromotive-force armature the armature-windings which terminate in the commutator L. I have indicated the opposing manner in which the two armatures of the generators A and A' are connected together by marking each brush with either the positive or negative sign in the usual manner. The current flows through each circuit when separately operated in the following manner: Starting at the positive brush $h'$, the current flows in the direction of the arrow-heads from the brush $h'$, thence through the conductor $R^2$, work-circuit W', conductor $R^3$, the counter-electromotive-force armature-circuit O, supplemental field-coil I' to negative brush $h$, thence through the armature-windings J, back to the brush $h'$ at the same time this armature-circuit J supplies the shunt-coil I. The current flows from the armature-circuit J' through the positive brush C', supplemental coil E', brush M, counter-electromotive-force armature-winding O', thence through negative brush N, conductor R, work-circuit W, conductor R', negative brush $C^2$, back to the armature-circuit J' at the same time the field-coil E is supplied with current from the armature J'. If the two work-circuits W and W' are operated at the same time, the flow would be as follows: Starting, as before, at the brush $h'$, the current would flow through the branch wire Q, brush $C^2$, armature-circuit J', brush C', supplemental field-coil E', brush M, armature-circuit O', brush N, conductor R, work-circuit W, branch wires Q' $Q^2$ $Q^3$, work-circuit W', armature-circuit O, brush D', supplemental coil I', brush $h$, armature-circuit J, and then returning to the brush $h'$. In this latter case the four armature-circuits and two work-circuits W and W' are all thrown into linear series with each other. The field-coils F and K are also supplied with current from the two armature-circuits J and J', and the secondary battery S and sparking device T are arranged in series circuit with these field-coils F and K. In this way the secondary battery can be charged with a very small volume of current, for the circuit through the sparking device T is not closed more than one-tenth of the time. Consequently if a half an ampere flows constantly through the secondary battery from the field-coils F and K, a current of five amperes can be delivered from the secondary battery for the tenth of the time the circuit through the sparking device T is closed.

I would have it understood that the two generators may either be mounted upon the same shaft or upon separate shafts, and also that the two generators may either be self-exciting or may be excited from any extraneous source, as may be preferred, within the scope of my invention.

Having thus described my invention, and in accordance therewith, I claim as new—

1. In a system of electrical regulation, the combination of two electric generators and a work-circuit, one of said generators being arranged to act as a counter electromotive force against the second generator, said generator which acts as a counterforce being provided with a series differential coil F, and said coil being supplied with current from the second generator, said counterforce-generator being used as a resistance to said work-circuit, substantially as described.

2. In a system of electrical regulation, the combination of two electric generators A and A' and a work-circuit W, said generators A and A' being provided with supplemental series coils E' F' respectively, the said coils and work-circuit being arranged in linear series with each other, said generator A' being used to regulate the resistance of said work-circuit, substantially as described.

3. The combination of two generators and a multiple-series work-circuit, each of said generators provided with two sets of armature-windings each set terminating in a separate commutator, the two armature-circuits of one of said generators generating a higher potential current than the other generator and supplying said work-circuit with current, the lower potential generator acting as a counter electromotive force to said work-circuit to counteract the variations of the speed of said generators, substantially as described.

4. In combination two sources of electricity and two work-circuits, each work-circuit having two main-line conductors, one main-line conductor of one circuit being joined to one of the main-line conductors of the other circuit by branch wires, thereby throwing the two work-circuits in linear-series circuit with each other, substantially as described.

5. In combination, a sparking device T, a secondary battery S, a generator provided with field-coils arranged in electrical circuit through said sparking device and secondary battery, substantially as described.

In testimony whereof I sign this specification in the presence of two witnesses.

THOMAS H. HICKS.

Witnesses:
O. B. BAENZIGER,
M. A. MARTIN.